United States Patent

Bickfrod

[15] 3,689,835
[45] Sept. 5, 1972

[54] ANALOG/DIGITAL METER HAVING FRONT INDICATOR MEANS OVERLYING A REAR INDICATOR MEANS

[72] Inventor: John H. Bickfrod, Middletown, Conn.

[73] Assignee: Veeder Industries Inc., Hartford, Conn.

[22] Filed: Sept. 10, 1970

[21] Appl. No.: 71,152

[52] U.S. Cl. ............... 324/115, 324/114, 340/324 R, 350/160 R
[51] Int. Cl. ........................... G01r 15/10, G01r 1/20
[58] Field of Search ..324/115, 114, 99 R, 99 D, 143, 324/156, 157; 340/324 R; 350/150, 160 R

[56] References Cited

UNITED STATES PATENTS

| | | |
|---|---|---|
| 3,421,083 | 1/1969 | Bosworth et al. ........ 324/99 R |
| 3,457,494 | 7/1969 | Friend et al. ............. 324/99 R |
| 3,505,804 | 4/1970 | Hofstein .................. 58/23 BA |

Primary Examiner—Rudolph V. Rolinec
Assistant Examiner—Ernest F. Karlsen
Attorney—Prutzman, Hayes, Kalb & Chilton

[57] ABSTRACT

An analog/digital meter comprising a transparent liquid crystal numeral indicator and an analog indicator with a pivotal needle mounted behind the numeral indicator. A mode selector switch provides for selectively operating the numeral and analog indicators for selectively presenting corresponding digital and analog readings in accordance with the voltage of an input electrical signal and the setting of a range selector switch. A wire magnet is mounted on the pivotal needle of the analog indicator, and a magnetic pickup head is pivotally mounted to be set at any point along the arc of travel of the wire magnet to generate a predetermining signal when the needle moves into alignment with the pickup head.

8 Claims, 2 Drawing Figures

PATENTED SEP 5 1972

3,689,835

INVENTOR
JOHN H. BICKFORD

BY Prutzman, Hayes, Kalb and Chilton
ATTORNEYS

ANALOG/DIGITAL METER HAVING FRONT INDICATOR MEANS OVERLYING A REAR INDICATOR MEANS

BRIEF SUMMARY OF THE INVENTION

The present invention relates generally to electrical measuring and testing instruments and more particularly to a new and improved analog/digital meter for presenting corresponding analog and digital readings.

It is a primary aim of the present invention to provide a new and improved analog/digital meter for selectively determining (a) if a measured amount is within a specified range, and (b) when the measured amount is outside the specified range, the precise amplitude of the measure amount. For example, the analog/digital meter of the present invention has utility in truck weighing stations for determining (a) if the axial loading of a truck is under a specified maximum, and (b) where the axial loading exceeds the specified maximum, the precise loading.

It is another aim of the present invention to provide a new and improved analog/digital meter which facilitates quality control measuring and testing. For example, the analog/digital meter may be used for determining (a) if the dimension of a part is within a specified tolerance, and (b) the exact dimension of only those parts which are outside the tolerance.

It is a further aim of the present invention to provide a new and improved analog/digital meter useful in multi-meter installations for simplifying monitoring the meter readings.

It is another aim of the present invention to provide a new and improved analog/digital meter having a predeterminer for generating a predetermining signal at a preselected reading of the meter.

Other objects will be in part obvious and in part pointed out more in detail hereinafter.

A better understanding of the invention will be obtained from the following detailed description and the accompanying drawing of an illustrative application of the invention.

DESCRIPTION OF THE PREFERRED EMBODIMENT

Figure 1:
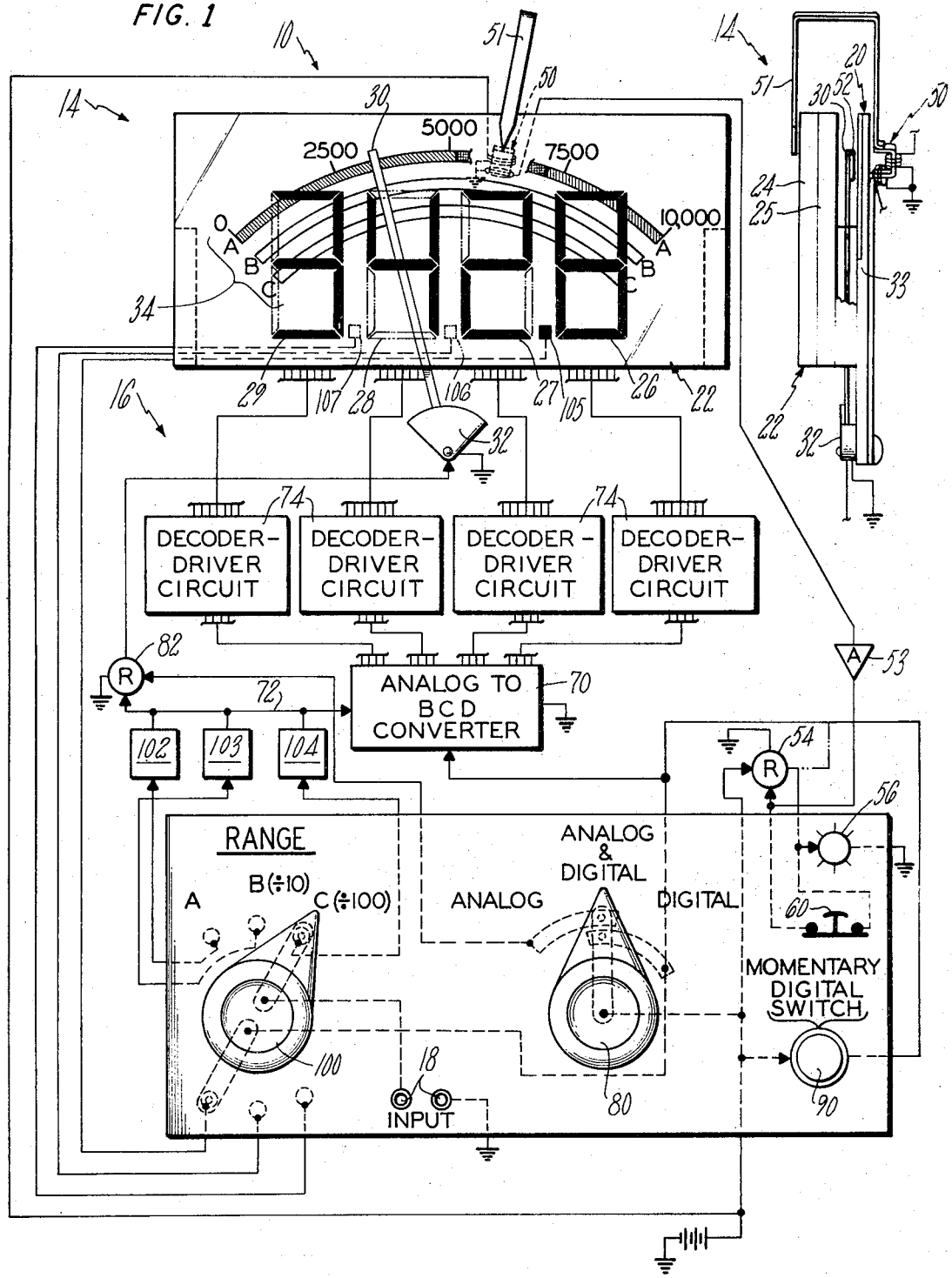
FIG. 1 is a generally schematic illustration of an embodiment of an analog/digital meter incorporating the present invention.
Figure 2:
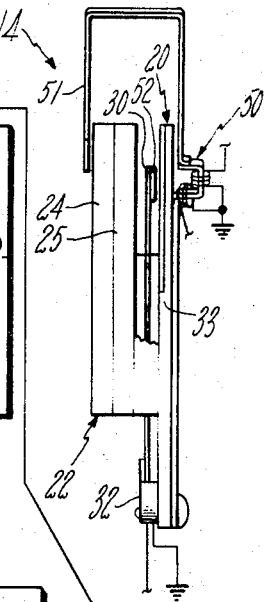
FIG. 2 is a side elevation view, partly broken away, of an indicator of the meter.

Referring now to the drawing in detail wherein like numerals represent like parts, an embodiment 10 of an analog/digital meter incorporating the present invention is shown comprising an indicator 14 and an indicator operating circuit 16 having input jacks 18 for connecting the meter to an input DC electrical signal. The indicator 14 comprises in overlying or superimposed relationship a rear analog indicator 20 and a front digital liquid crystal indicator 22 (for example of the type disclosed and described in U.S. Pat. No. 3,505,804 of Steven R. Hofstein dated Apr. 14, 1970 and entitled "Solid State Clock"). In a known manner the liquid crystal indicator 22 comprises a pair of transparent glass plates 24, 25 with inner opposed faces suitably coated (with a conductive but transparent material) to provide four seven-bar, FIG. 8 type numeral indicators 26–29 which may be collectively operated to provide an opaque display of any numeral from 0000 through 9999.

When not energized the liquid crystal indicator 22 is substantially completely transparent to facilitate reading the analog indicator 20. The analog indicator 20 comprises a pivotal pointer or needle 30 and a suitable D'Arsonval type needle actuator 32 operable to displace the pointer 30 from its "0" or left-hand pivotal limit position in proportion to the applied voltage. A fixed back plate 33 (constructed of a suitable nonmagnetic material) is mounted immediately behind the needle 30 and bears a scale 34 which is preferably custom calibrated for each meter application. The scale 34 is shown composed of separate "A", "B" and "C" range scales (for the "A", "B" and "C" meter ranges hereinafter described) which are custom color-coded as shown with the "A" range scale. Also, the scale 34 may be provided with appropriate numeral indicia as shown in FIG. 1 for obtaining an approximate numerical reading with the analog indicator 20.

A magnetic pickup head 50 is pivotally mounted coaxially with the needle 30 and behind the back plate 33 and an integral pointer 51 is provided for manually presetting the pickup head 50 at any point along the arc of travel of the needle 30. An elongated magnetic wire or rod 52 is mounted on the backside of the needle 30 and is constructed and premagnetized (preferably to form a "magnetic domain" type magnet) to effect generation of an electrical pulse with the pickup head 50 when the needle 30 moves into alignment with the pickup head 50. The pickup head 50 is connected via an amplifier 53 and relay 54 to operate a light 56 with the generated pulse, and a normally closed push button switch 60 is provided for selectively manually de-energizing or resetting the relay 54. Thus, the pickup head 50 may be manually preset to provide a predetermining signal with the light 56 at any desired reading of the analog indicator 20.

An analog-to-BCD converter 70 provides for converting the applied voltage in lead 72 to an appropriate BCD output, and suitable decoder-driver circuits 74 provide for converting the BCD output for operating the numeral indicators 26–29 for producing a numerical reading corresponding to the analog reading of the analog indicator 20. Thus, for any applied voltage (within the voltage range of the meter) the analog and digital indicators 20, 22 are operative to provide corresponding analog and digital readings.

A mode selector knob 80 is provided for selectively activating the analog indicator 20 with the relay 82 and for selectively activating the digital indicator 22 by activating the analog-to-BCD converter 70. In the "Analog" and "Analog and Digital" positions of the mode selector 80, the relay 82 is energized for activating the analog indicator 20, and in the "Analog and Digital" and "Digital" positions of the mode selector 80, the analog-to-BCD converter 70 is activated for activating the digital indicator 22. In the "Analog" position of the mode selector 80 the digital indicator 22 remains completely transparent and thereby forms a window for reading the analog indicator 20. Also, a push button 90 is provided for temporarily activating the analogeto-BCD converter 70 for providing a digital reading with the digital indicator 22, and if desired the relay 54 may be connected to activate the digital indicator 22 when the predetermining light 56 is energized and thereby provide for automatically activating the digital indicator 22 at the setting of the magnetic pickup head 50.

A range selector 100 provides for selectively connecting the input signal to lead 72 via suitable "range" impedance circuits 102–104 and to thereby provide three meter ranges designated "A", "B" and "C" which vary by a factor of 10. The "A" range provides the greatest sensitivity and the "C" range provides a reading over the greatest input voltage range. The range selector 100 also provides for selectively energizing decimal point indicators 105–107 of the digital indicator 22 such that the decimal point is automatically located for each range. The decimal points 105–107 may be formed as part of the liquid crystal indicator or may be provided by separate lights (e.g., light emitting diodes) and the range selector 100 is connected so that the decimal point indicator for the selected range is activated when the digital indicator 22 is activated.

As will be apparent to persons skilled in the art, various modifications, adaptations and variations of the foregoing specific disclosure can be made without departing from the teachings of the present invention.

I claim:

1. An analog/digital meter comprising, a rear readout indicator, a front readout indicator overlying the rear readout indicator, said front readout indicator including a generally transparent indicator structure adapted to be inactivated to provide a substantially unobstructed view of the rear indicator through the transparent indicator structure or be activated to provide a readout which may be read in addition to the readout of the rear readout indicator, the other readout indicator being an analog indicator operable for displaying an analog readout, and an indicator operating circuit operable by variable input electrical signal means through an established range of value thereof for operating the digital and analog indicators for respectively displaying numerical and analog readouts corresponding to the value of the input electrical signal means, the indicator operating circuit comprising control means for selectively activating and inactivating the front readout indicator.

2. An analog/digital meter according to claim 1 wherein the front indicator is a liquid crystal indicator.

3. An analog/digital meter according to claim 1 wherein the operating circuit comprises manual switch means for manually selectively activating and deactivating the front readout indicator to display its readout.

4. An analog/digital meter according to claim 1 wherein the analog readout indicator comprises an analog needle, a needle actuator operable by the operating circuit for positioning the analog needle in accordance with the value of said input electrical signal means, and a calibrated scale mounted behind the path of movement of the needle.

5. An analog/digital meter according to claim 4 further comprising a magnet mounted on the needle and a magnetic pickup head settable along a path adjacent the path of movement of the needle and operable by the magnet as it moves into operative alignment therewith for generating a predetermining electrical signal.

6. An analog/digital meter according to claim 5 wherein the analog needle is pivotally mounted and the magnetic pickup head is pivotally mounted coaxially with the analog needle.

7. An analog/digital meter comprising front and rear contiguous readout indicators having respectively a front generally transparent visual readout area and a rear visual readout area underlying the front generally transparent readout area, one of the readout indicators being a digital indicator operable for displaying in its readout area any numerical readout within a multiple place range, the other readout indicator being an analog indicator operable for displaying an analog readout in its readout area, and an indicator operating circuit operable by variable input electrical signal means through an established range of value thereof for operating the digital and analog indicators for respectively displaying numerical and analog readouts corresponding to the value of the input electrical signal means, the readout area of the analog indicator being directly behind the readout area of the digital indicator and the readout area of the digital indicator being formed by a window which is generally transparent when the digital indicator is not operated to display a numerical readout, the analog indicator comprising an analog needle, a needle actuator operable by the operating circuit for positioning the analog needle in accordance with the value of said input electrical signal means, a calibrated scale mounted behind the path of movement of the needle, a magnet mounted on the needle and a magnetic pickup head settable along a path adjacent the path of movement of the needle and operable by the magnet as it moves into operative alignment therewith for generating a predetermining electrical signal, the operating circuit being operable by the predetermining electrical signal for operating the digital indicator to display said numerical readout.

8. An analog/digital meter according to claim 1 wherein the control means comprises predetermining means operable in conjunction with the analog readout indicator for automatically operating the digital readout for displaying the numerical readout at a predetermined analog readout of the analog readout.

* * * * *